United States Patent
Soroush et al.

(10) Patent No.: US 11,483,354 B2
(45) Date of Patent: Oct. 25, 2022

(54) SYSTEM AND METHOD FOR REASONING ABOUT THE OPTIMALITY OF A CONFIGURATION PARAMETER OF A DISTRIBUTED SYSTEM

(71) Applicant: Palo Alto Research Center Incorporated, Palo Alto, CA (US)

(72) Inventors: Hamed Soroush, San Jose, CA (US); Shantanu Rane, Menlo Park, CA (US)

(73) Assignee: Palo Alto Research Center Incorporated, Palo Alto, CA (US)

(*) Notice: Subject to any disclaimer, the term of this patent is extended or adjusted under 35 U.S.C. 154(b) by 308 days.

(21) Appl. No.: 16/923,763

(22) Filed: Jul. 8, 2020

(65) Prior Publication Data

US 2021/0014264 A1    Jan. 14, 2021

Related U.S. Application Data

(60) Provisional application No. 62/873,746, filed on Jul. 12, 2019.

(51) Int. Cl.
*H04L 9/40* (2022.01)
*G06F 21/57* (2013.01)
*G06F 16/25* (2019.01)
*G06N 5/04* (2006.01)
*G06N 3/04* (2006.01)

(52) U.S. Cl.
CPC .......... *H04L 63/205* (2013.01); *G06F 16/252* (2019.01); *G06F 21/577* (2013.01); *G06N 3/04* (2013.01); *G06N 5/04* (2013.01); *H04L 63/1433* (2013.01); *G06F 2221/034* (2013.01)

(58) Field of Classification Search
CPC ..................................................... H04L 63/205
See application file for complete search history.

(56) References Cited

U.S. PATENT DOCUMENTS

| | | | | |
|---|---|---|---|---|
| 2013/0232331 | A1* | 9/2013 | Farhan | G06F 11/328 713/100 |
| 2016/0050116 | A1* | 2/2016 | Sheshadri | H04L 67/125 709/221 |
| 2017/0195349 | A1* | 7/2017 | Shabtai | H04L 63/1433 |

* cited by examiner

*Primary Examiner* — Simon P Kanaan
(74) *Attorney, Agent, or Firm* — Yao Legal Services, Inc.; Shun Yao

(57) ABSTRACT

Embodiments provide a system and method for reasoning about the optimality of a configuration parameter of a distributed system. During operation, the system obtains a multi-layer graph for a system with a plurality of components, wherein the multi-layer graph comprises a configuration subgraph, a vulnerability subgraph, and a dependency subgraph. The system determines, based on the multi-layer graph, constraint relationships associated with configuration parameters for the components, wherein the constraint relationships include security constraints and functionality constraints. The system computes an unsatisfiable core which comprises a set of mutually incompatible constraints. The system resolves, based on a strategy and over multiple iterations, the unsatisfiable core by analyzing one pair of mutually incompatible constraints per a respective iteration, to obtain a new unsatisfiable core which comprises a smaller number of mutually incompatible constraints than the computed unsatisfiable core or a previously computed unsatisfiable core from a most recent iteration.

20 Claims, 11 Drawing Sheets
(3 of 11 Drawing Sheet(s) Filed in Color)

| ITERATION NO. 402 | UNSAT CORE STATUS 404 | REMAINING MUTUALLY INCOMPATIBLE CONSTRAINTS 406 | ASSOCIATED INFO/REASON 418 | CONSTRAINT DROPPED FROM PREV ITERATION 410 |
|---|---|---|---|---|
| 2 | NON-EMPTY | CONSTRAINT_NAME_1 CONSTRAINT_NAME_2 ... CONSTRAINT_NAME_n | INFO_1 INFO_2 INFO_3 | CONSTRAINT_NAME_x |
| ... | ... | ... | ... | ... |
| 9 | NON-EMPTY | CONSTRAINT_NAME_4 CONSTRAINT_NAME_5 ... CONSTRAINT_NAME_m | REASON_4 REASON_5 ... REASON_m | CONSTRAINT_NAME_z |

FIG. 4B

SYSTEM AND METHOD FOR REASONING ABOUT THE OPTIMALITY OF A CONFIGURATION PARAMETER OF A DISTRIBUTED SYSTEM

RELATED APPLICATIONS

This application claims the benefit of:

U.S. Provisional Application No. 62/873,746, entitled "System and Method for Improving the Security Versus Functionality Tradeoff of a Composed Internet of Things System," by inventors Hamed Soroush and Shantanu Rane, filed 12 Jul. 2019, which subject matter is related to the subject matter in U.S. patent application Ser. No. 16/219,774, entitled "Method for Improving the Security of a Networked System by Adjusting the Configuration Parameters of the System Components," by inventors Hamed Soroush and Shantanu Rane, filed 13 Dec. 2018 (hereinafter "U.S. patent application Ser. No. 16/219,774"), which application claims the benefit of U.S. Provisional Application No. 62/718,328, titled "Method for Improving the Security of a Networked System by Adjusting the Configuration Parameters of the System Components," by inventors Hamed Soroush and Shantanu Rane, filed 13 Aug. 2018; and is further related to U.S. patent application Ser. No. 16/918,966, entitled "SYSTEM AND METHOD FOR EXTRACTING CONFIGURATION INFORMATION FOR REASONING ABOUT THE SECURITY AND FUNCTIONALITY OF A COMPOSED INTERNET OF THINGS SYSTEM," by inventors Hamed Soroush, Milad Asgari Mehrabadi, Shantanu Rane, and Marc Mosko, filed 1 Jul. 2020 (hereinafter "U.S. patent application Ser. No. 16/918,966"); and U.S. patent application Ser. No. 16/918,971, entitled "SYSTEM AND METHOD FOR CONSTRUCTING A GRAPH-BASED MODEL FOR OPTIMIZING THE SECURITY POSTURE OF A COMPOSED INTERNET OF THINGS SYSTEM," by inventors Hamed Soroush, Milad Asgari Mehrabadi, and Shantanu Rane, filed 1 Jul. 2020 (hereinafter "U.S. patent application Ser. No. 16/918,971"), the disclosures of which are herein incorporated by reference in their entirety.

STATEMENT OF GOVERNMENT-FUNDED RESEARCH

This invention was made with U.S. government support under (Contract Number) Award Number: FA8750-18-2-0147 awarded by the Defense Advanced Research Projects Agency (DARPA) of the Department of Defense (DoD). The U.S. government has certain rights in the invention.

BACKGROUND

Field

This disclosure is generally related to improving the security versus functionality tradeoff. More specifically, this disclosure is related to a system and method for reasoning about the optimality of a configuration parameter of a distributed system.

Related Art

As cybersystems become increasingly complex and connected, configuration analytics may play a critical role in the correct and secure operation of cybersystems or composed systems (e.g., a networked Industrial Control System (ICS) or an Internet of Things (IoT) system). Given the significant number of interconnected components in a composed system, providing the appropriate level of security for such networked systems may pose a challenge. For example, a majority of the security compromises in IoT systems can be attributed to misconfigurations, i.e., combinations of configuration parameters of the individual system components that expose vulnerabilities to an adversary. Attackers may rely on unpatched vulnerabilities and configuration errors to gain unauthorized access to system resources. Misconfigurations can occur at any level of a system's software architecture. Thus, correctly configuring systems can become increasingly complex given multiple interconnected systems.

Current solutions may focus narrowly on tuning the configuration parameters of individual system components. However, these solutions lack a principled approach to managing the complex relationships between the configuration parameters of the many components of a composed system, and do not leverage the complex relationships among the configuration parameters of the individual system components. These solutions do not account for the dependencies among the configuration parameters of the interconnected system components or devices. Furthermore, current solutions do not provide a principled approach to account for the effect of configuration parameters on the attack sequences that are available to an adversary, nor do they provide functional dependencies between the interconnected system components or devices.

SUMMARY

The embodiments described herein provide a system and method for reasoning about the optimality of a configuration parameter of a distributed system. During operation, the system obtains a multi-layer graph for a system with a plurality of components, wherein the multi-layer graph comprises a configuration subgraph, a vulnerability subgraph, and a dependency subgraph. The system determines, based on the multi-layer graph, constraint relationships associated with configuration parameters for the components, wherein the constraint relationships include security constraints and functionality constraints. The system computes an unsatisfiable core which comprises a set of mutually incompatible constraints. The system resolves, based on a strategy and over multiple iterations, the unsatisfiable core by analyzing one pair of mutually incompatible constraints per a respective iteration, to obtain a new unsatisfiable core which comprises a smaller number of mutually incompatible constraints than the computed unsatisfiable core or a previously computed unsatisfiable core from a most recent iteration.

In some embodiments, the functionality constraints positively express functionality requirements associated with the components based on one or more of: a connectivity between components; a configuration parameter for a respective component; a first relationship between configuration parameters associated with a single component; and a second relationship between configuration parameters associated with a pair of components. The security constraints include one or more of: a positive expression of known security vulnerabilities or a negation of predicates corresponding to the known security vulnerabilities, wherein the known security vulnerabilities are obtained from a public or a proprietary database; a positive expression of bad security practices or a negation of predicates corresponding to the bad security practices; and a positive expression of best security practices or a negation of predicates corresponding to the best security practices.

In some embodiments, resolving the unsatisfiable core based on the strategy and over multiple iterations is based on one or more of: an operational context of the system; improving a current configuration of the system without prioritizing security over functionality or functionality over security; preserving constraints which prioritize security over functionality; and preserving constraints which prioritize functionality over security.

In some embodiments, the system resolves the unsatisfiable core based on the strategy and over multiple iterations, by: the system divides the components of the system into subsets of components; the system assigns a strategy to each subset; and the system employs the assigned strategy in the multiple iterations of resolving the unsatisfiable core.

In some embodiments, the system determines that resolving the unsatisfiable core based on the strategy and over multiple iterations results in an empty unsatisfiable core and a set of mutually compatible constraints, wherein the configuration parameters which satisfy the mutually compatible constraints are associated with a desired output configuration.

In some embodiments, the system displays, on a screen of a user device, one or more interactive elements which allow the user to view, for a respective iteration, one or more of: a number corresponding to the respective iteration; whether the new unsatisfiable core is empty; a remaining set of mutually incompatible constraints; and an indicator of a constraint removed from the previously computed unsatisfiable core.

In some embodiments, the system determines that resolving the unsatisfiable core based on the strategy and over multiple iterations results in a non-empty unsatisfiable core which comprises a remaining set of mutually incompatible constraints. The system returns the non-empty unsatisfiable core and a reason for the remaining set of mutually incompatible constraints.

In some embodiments, the system displays, on a screen of a user device, one or more interactive elements which allow the user to view one or more of: the non-empty unsatisfiable core; the remaining set of mutually incompatible constraints; and the reason for a respective remaining mutually incompatible constraint.

In some embodiments, the system terminates the multiple iterations of resolving the unsatisfiable core based on one or more of: reaching a number of the multiple iterations, wherein the number is configured by a user of the system or set as a default by the system; exceeding the number of the multiple iterations; and determining a failure to produce an empty unsatisfiable core.

In some embodiments, resolving the unsatisfiable core based on the strategy and over multiple iterations is based on generating a constraint satisfaction problem. The constraint satisfaction problem is based on one or more of: determining that constraints associated with the configuration subgraph are satisfied; determining that constraints associated with the dependency subgraph are satisfied; and minimizing a security impact of all attack paths traversable in the multi-layer graph. The system terminates the multiple iterations of resolving the unsatisfiable core based on determining a failure to produce a solution to the constraint satisfaction problem.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 2B-1 illustrates an exemplary multi-layer graph corresponding to the network diagram of FIG. 2A, in accordance with an embodiment of the present application.

FIG. 2B-2 illustrates an exemplary multi-layer graph corresponding to the network diagram of FIG. 2A, in accordance with an embodiment of the present application.

FIG. 4B illustrates an exemplary display on a user device, including the results of unsuccessfully resolving the unsatisfiable core, in accordance with an embodiment of the present application.

DETAILED DESCRIPTION

Figure 1:
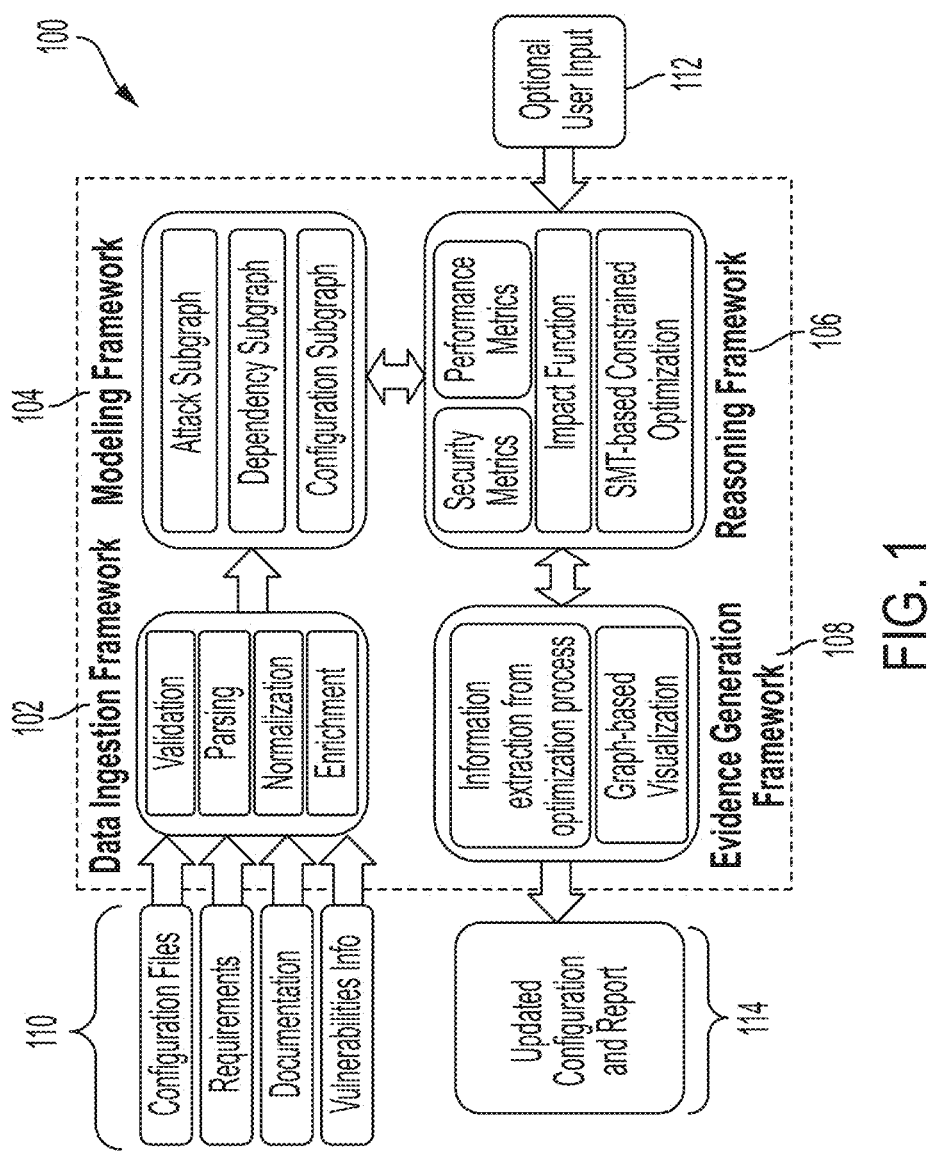
FIG. 1 illustrates an exemplary environment for facilitating an improvement in the security versus functionality tradeoff of a composed system, in accordance with an embodiment of the present application.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

The embodiments described herein provide a system which reasons about the optimality of a configuration parameter of a distributed system. Reasoning about the optimality of a configuration parameter can be part of a reasoning framework or module, as one of four modules of a larger system described in U.S. patent application Ser. No. 16/219,774. This larger or overall system can be referred to as secure configurations for the IoT based on optimization and reasoning on graphs (or "SCIBORG"). The overall system can include the following four frameworks: (1) a data ingestion framework; (2) a modeling framework; (3) a reasoning framework; and (4) an evidence generation framework, as summarized below in relation to FIG. 1.

The overall system can model a composed system by constructing a multi-layer graph for a system with a plurality of components. The multi-layer graph can include: a dependency subgraph that captures the functional relationships among system components; a configuration subgraph that accounts for relationships among configuration parameters within and across components; and an attack or vulnerability subgraph modeling the vulnerabilities of the system and the user of those vulnerabilities in multi-step attacks. The modeling framework can take as input the data ingested and extracted by the data ingestion module. Extracted configuration information can be used to generate the configuration subgraph, extracted vulnerability information can be used to generate the vulnerability subgraph, and extracted dependency information can be used to generate the dependency subgraph. The modeling framework is described in U.S. patent application Ser. No. 16/918,971, and the data ingestion framework is described in U.S. patent application Ser. No. 16/918,966.

As described above, current solutions which work on minimizing the attack surface of a system do not capture the intricate relationships between configuration parameters, attack paths available to an adversary, and functional dependencies among system components. Thus, current solutions generally fail to reduce the risk associated with residual vulnerabilities. The overall system addresses these issues by characterizing the potential impact of multi-step attacks enabled by configuration settings.

The overall system also uses algorithms and software tools to jointly analyze the subgraphs of the multi-layer graph in order to reason about the impact of a candidate configuration set on the security and functionality of the composed system, e.g., via the reasoning framework, by using a Satisfiability Modulo Theory (SMT) solver to express the complex relationships among the configuration parameters as constraints in a security optimization problem.

The overall system can be implemented with a scalable pipeline, which can: ingest system requirements, configuration files, software documentation and various types of configuration vulnerabilities (data ingestion framework); based on the data ingested in the data ingestion framework, build a queryable, graph-based representation of the relationships between configuration vulnerabilities and attack scenarios, configuration parameters, and system components (modeling framework); provide an application programming interface (API) to perform a quantitative, comparative analysis of the security impact of configuration settings (reasoning framework); automatically construct a constraint satisfaction problem based on the model and utilize a Z3 SMT solver to solve for optimal parameter values (reasoning framework); and provide human-readable evidence about the optimality of the selected configuration (evidence generation framework).

In the embodiments described herein, the reasoning framework can obtain or take as input the multi-layer graph constructed by the modeling framework for a system with a plurality of components. The multi-layer graph can include a configuration subgraph, a vulnerability subgraph, and a dependency subgraph, including nodes in each of the three subgraphs as well as directed edges between nodes in a same graph or between nodes in different subgraphs. The reasoning framework can determine constraint relationships associated with configuration parameters for the components. These constraint relationships can include security constraints and functionality constraints, as described below. The reasoning framework can be implemented by using a solver, such as an SMT solver, to determine configurations which minimize the security impact to the overall system while satisfying configuration constraints and preserving the functionality of the overall system. The reasoning framework can also determine configurations which optimize or prioritize functionality constraints over security constraints, depending on a chosen "constraint relaxation strategy" (or "strategy"). This strategy can be one of three strategies, and can be chosen by a user or configured by the system based on an operational context of the overall system, as described below.

The reasoning framework, via the SMT solver, can compute an unsatisfiable core ("unsat core"), which can include mutually incompatible constraints. This computation can be based on solving a Constraint Satisfaction Problem (CSP). The reasoning framework can resolve the unsat core and attempt to solve the CSP based on the chosen strategy and over multiple iterations (or rounds), for a number of rounds until: the CSP is satisfied; the unsat core is empty and includes no remaining mutually incompatible constraints; the number of iterations exceeds a predetermined or configured number of rounds; or the SMT solver fails to produce an empty unsat core and a solution to the CSP.

After each iteration or round, the reasoning framework can display, on a screen of user device, interactive elements which allow the user to view, for each iteration, one or more of: a number corresponding to the respective iteration; whether the new unsatisfiable core is empty; a remaining set of mutually incompatible constraints; and a resolution of any constraints removed from the previously computed unsatisfiable core.

If the reasoning framework terminates the iterations, or determines that resolving the unsat core results in a non-empty unsat core which includes a remaining set of mutually incompatible constraints, the reasoning framework can display, on the screen of the user device, interactive elements which allow the user to view one or more of: the non-empty unsatisfiable core; the remaining set of mutually incompatible constraints; and the reason for a respective remaining mutually incompatible constraint. Exemplary user displays are described below in relation to FIGS. 4A and 4B.

The reasoning framework can also provide its output (e.g., the unsat core from each round, including the corresponding set of mutually incompatible constraints for each unsat core) to the evidence generation framework, which can provide and display additional information on the screen of the user device as part of an interactive graphical user interface.

The terms "framework" and "module" are used interchangeably in this disclosure, and refer to a component or unit of the "overall system" or "SCIBORG." A framework or module can be associated with various operations and functions, as described herein.

The term "overall system" refers to SCIBORG, which includes the four frameworks (i.e., data ingestion framework, modeling framework, reasoning framework, and evidence generation framework). The terms "reasoning framework" and "reasoning module" are used interchangeably in this disclosure, and refer to one of the four frameworks of the overall system or SCIBORG. The term "system" can refer to the overall system or the reasoning module/framework.

The terms "vulnerability graph" and "attack graph" are used interchangeably in this disclosure, and refer to one of the three subgraphs of the generated multi-layer graph.

The terms "graph" and "subgraph" are used interchangeably in this disclosure to describe the three graphs or subgraphs which make up the generated multi-layer graph of the described embodiments, i.e.: the configuration graph or subgraph; the vulnerability graph or subgraph; and the dependency graph or subgraph.

The terms "node" and "vertex" are used interchangeably in this disclosure, and refer to a point, unit, or object in a graph or subgraph.

The terms "strategy" and "policy" are used interchangeably in this disclosure, and refer to a feature which is configured by a user or set by the system.

The terms "iteration" and "round" are used interchangeably in this disclosure, and refer to an operation of the reasoning framework in comparing or analyzing a pair of mutually incompatible constraints.

The terms "unsatisfiable core" or "unsat core" are used interchangeably in this disclosure, and refer to the result of the solver after performing multiple iterations to resolve mutually incompatible constraints associated with configuration parameters of a target system, including functionality constraints and security constraints.

The term "solver" can refer to a mathematical solver, such as a Satisfiability Modulo Theory (SMT) solver or a Satisfiability (SAT) solver.

High-Level Overview of System with Four Frameworks/Modules

FIG. 1 illustrates an exemplary environment 100 for facilitating an improvement in the security versus functionality tradeoff of a composed system, in accordance with an embodiment of the present application. Environment 100 can depict or indicate the overall system or SCIBORG. The overall system can include a data ingestion framework 102, a modeling framework 104, a reasoning framework 106, and an evidence generation framework 108. Data ingestion framework 102 can determine information sources associated with software, hardware, middleware, and networking components of a system, and can further receive data from those information sources as input (e.g., input 110 which can include configuration files, functional requirements, documentation, and vulnerabilities information).

Modeling framework 104 can take as input information obtained, ingested, and extracted by data ingestion framework 102, and can produce as output three subgraphs which comprise the multi-layer graph described herein: an attack subgraph 122; a dependency subgraph 124; and a configuration subgraph 126. Reasoning framework 106 can use the constructed multi-layer graph output by modeling framework 104, and reasoning framework 106 can also receive an optional user input 112. A detailed flow of the operations performed by reasoning framework 106 is described below in relation to FIGS. 4A, 4B, 5, and 6. Evidence generation framework 108 can use as input the output of reasoning framework 106, and evidence generation framework 108 can produce as output an updated configuration and report 114.

Exemplary Multi-Layer Graph Constructed by the Modeling Framework

Figure 2A:
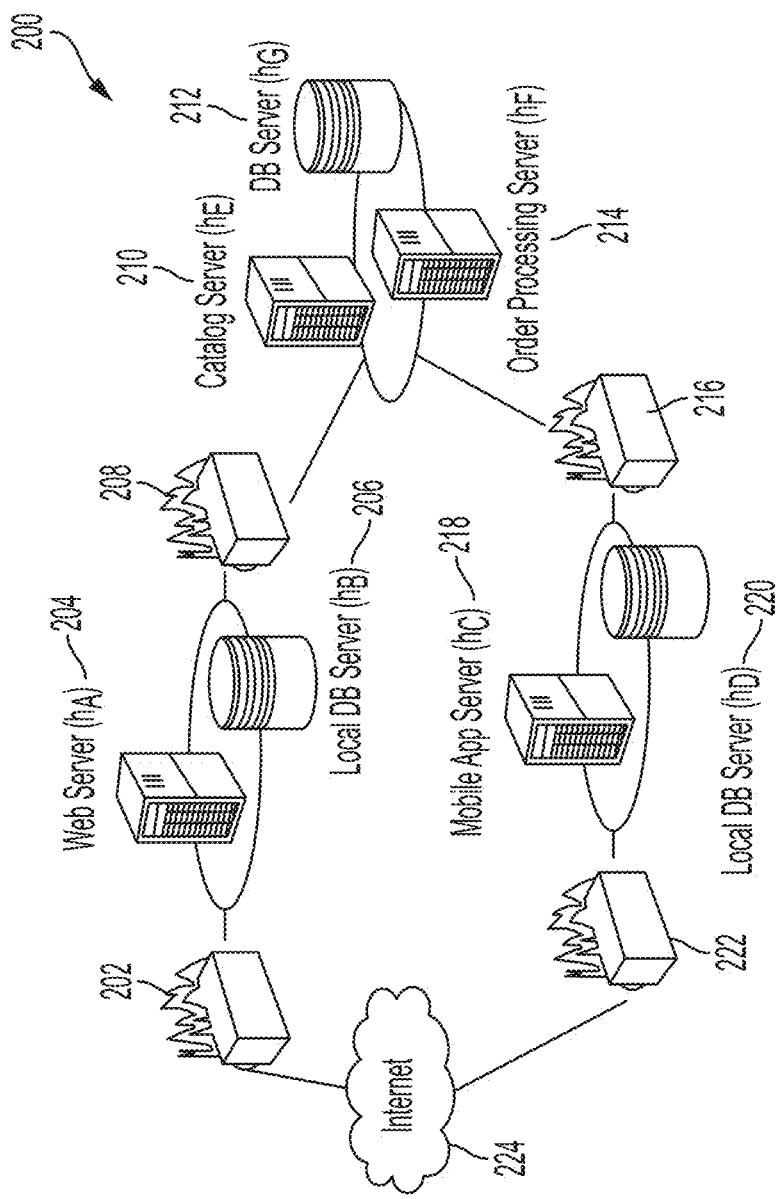
FIG. 2A illustrates an exemplary network diagram of an e-commerce system, in accordance with an embodiment of the present application.

FIG. 2A illustrates an exemplary network diagram 200 of an e-commerce system, in accordance with an embodiment of the present application. Diagram 200 can include clusters or groups of entities separated by firewalls and connected via a network 224 (e.g., the internet). For example, a first set of entities can include a Web Server 204 ($h_A$) and a Local Database Server 206 ($h_B$). The first set of entities can be separated by a firewall 208 from a second set of entities, which can include a Catalog Server 210 ($h_E$), a Database Server 212 ($h_G$), and an Order Processing Server 214 ($h_F$). The second set of entities can be separated by a firewall 216 from a third set of entities, which can include a Mobile Application Server 218 ($h_C$) and a Local Database Server 220 ($h_D$). The third set of entities can be separated by a firewall 222 from network or internet 224, and the first set of entities can be separated by a firewall 202 from network or internet 224. Entities in a same or different group may be dependent upon each other, as depicted below in relation to FIG. 2B.

Figures 1, 2B:
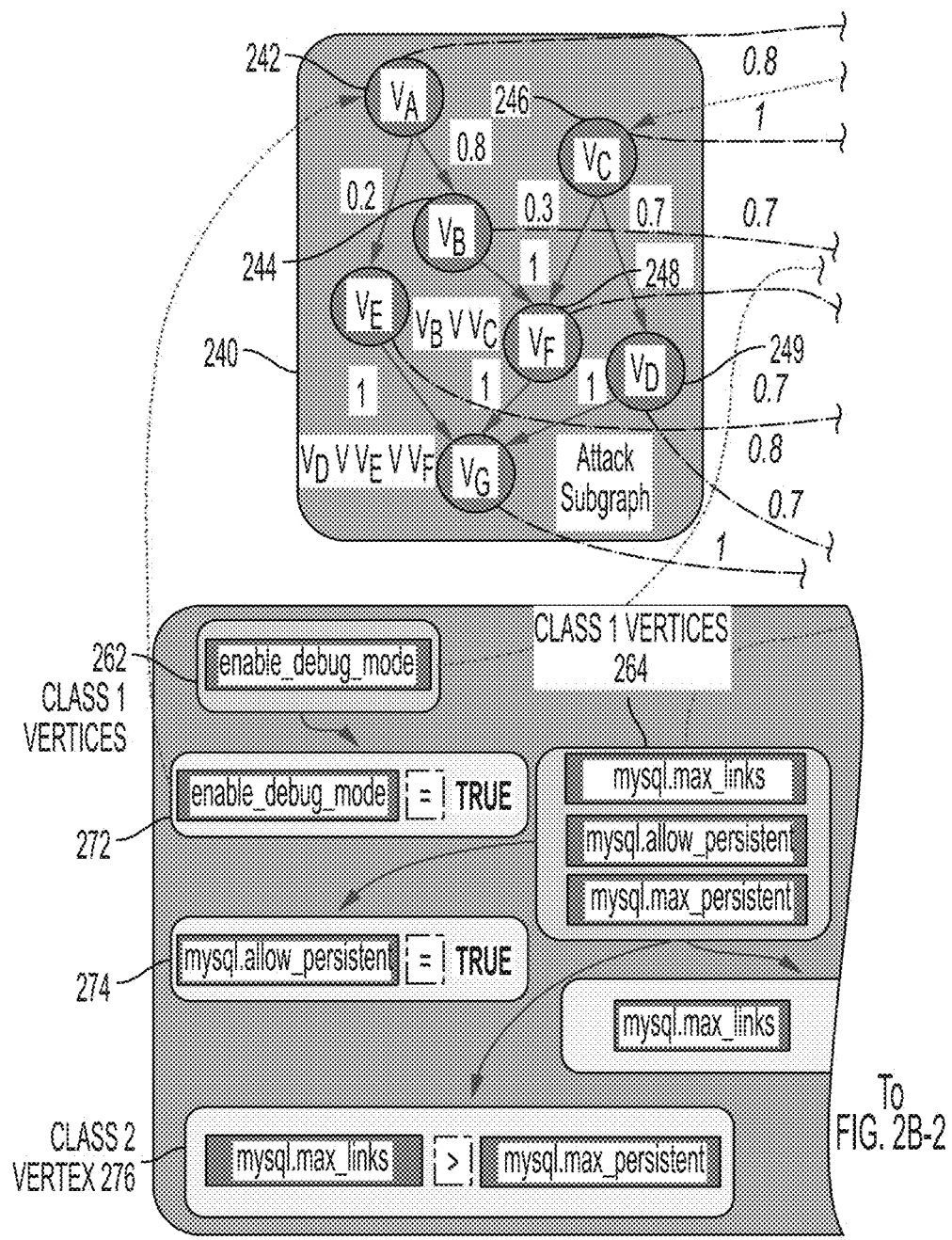
Figures 2, 2B:
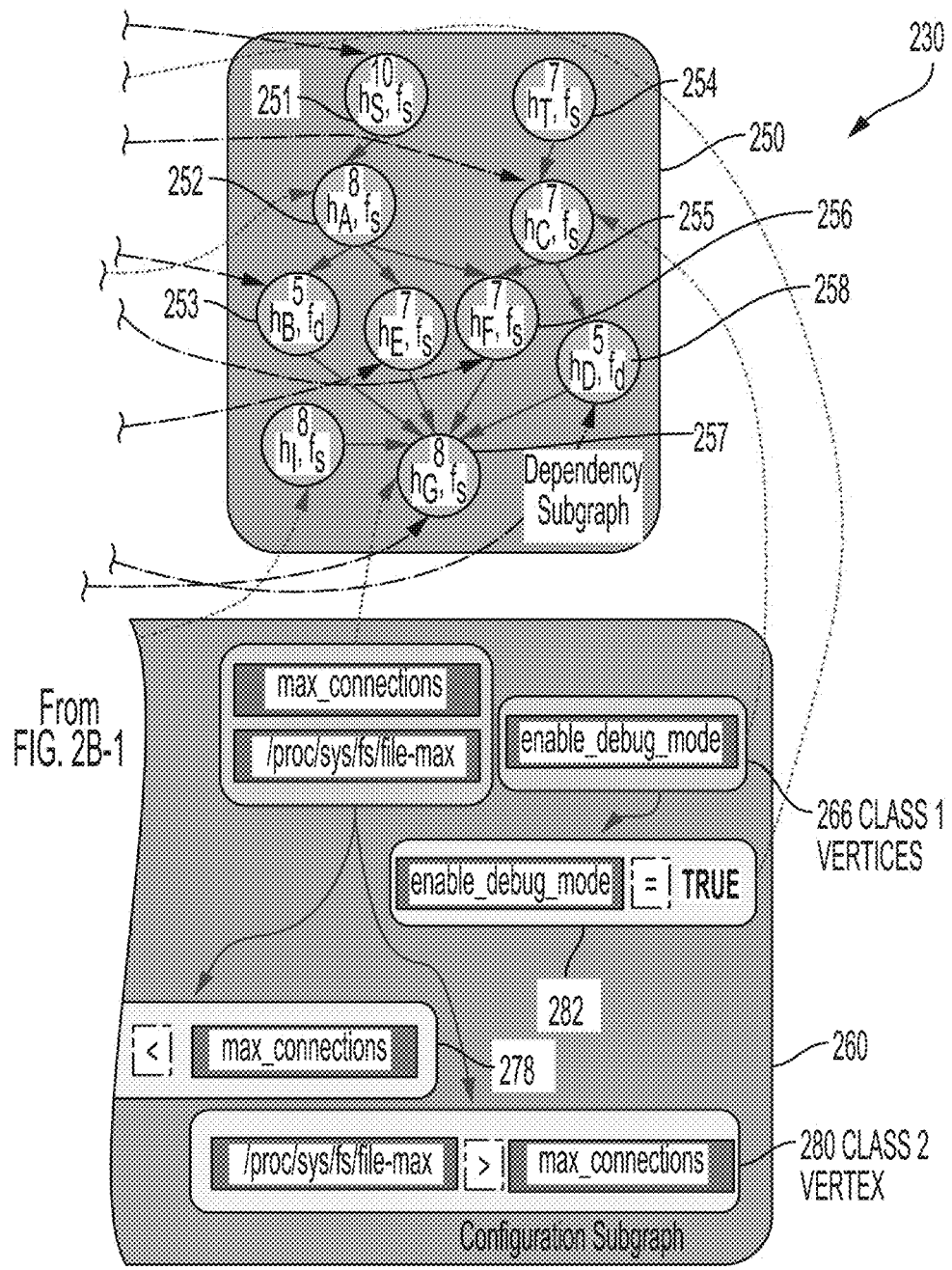

FIGS. 2B-1 and 2B-2 illustrate an exemplary multi-layer graph 230 corresponding to the network diagram of FIG. 2A, in accordance with an embodiment of the present application. Graph 230 can include an attack subgraph 240, a dependency subgraph 250, and a configuration subgraph 260.

As described above, modeling framework 104 of FIG. 1 can use the ingested data from data ingestion framework 102 to construct a three-layer directed graph that efficiently encodes the information needed for computing optimal configurations. A first layer can comprise a dependency subgraph, a second layer can comprise a configuration subgraph, and a third layer can comprise an attack subgraph. The edges between these three subgraphs can determine the functional composition and the attack surface for a configuration set, as described in detail below.

The dependency subgraph (subgraph 250) represents the functional dependencies between components of the target composed system. In this subgraph, each vertex represents a functional component of the system and carries a utility value. Each vertex also has a label identifying one of three dependency types, as described below. Each edge in the dependency subgraph represents a functional dependency on another component, as specified by the dependency label of the parent vertex.

The configuration subgraph (subgraph 260) represents relationships between configuration parameters, both within any system component and across different components of the composed system. There are two classes of vertices in the configuration subgraph: a first class of nodes or "Class 1" vertices capture per-component configuration parameters; and a second class of nodes or "Class 2" vertices capture relationships among (or conditions on) the configuration parameters. These relationships are specified by functional system requirements and admissibility of the configuration setting, as described below. Furthermore, some of the relationships between the configuration parameters enable or disable preconditions for system vulnerabilities, which can result in inducing a particular attack subgraph for that configuration.

For example, configuration subgraph 260 can include Class 1 vertices 262, 264, and 266, where each group of Class 1 vertices is depicted in its own pink-colored box and corresponds to configuration parameters for a specific component depicted in dependency subgraph 250. Furthermore, configuration subgraph 260 can include Class 2 vertices 272, 274, 276, 278, 280, and 282, where each respective Class 2 vertex is depicted in its own beige-colored box and corresponds to a configuration constraint between configuration parameters (whether between configuration parameters within a same component or across different components), such as the configuration parameters indicated by Class 1 vertices 262-266.

The attack subgraph (subgraph 240) represents the propagation of potential multi-step attacks on components in the dependency graph for a particular configuration. In the attack subgraph, each vertex represents a vulnerability. An edge in the attack subgraph indicates that exploiting the parent vulnerability (a node at the start of a first green-colored arrow) can set the stage for the attacker to exploit the child vulnerability (a node at the end of the first green-colored arrow). Each edge is also labeled with a probability value, representing the probability of the attack progressing along that edge. The nodes and edges in attack subgraph 240 are described below.

In addition to the edges within subgraphs, the overall system and the constructed multi-layer graph can include edges across the three subgraphs, e.g., edges between nodes in different subgraphs or directed edges from a node in one subgraph to a node in another subgraph. That is, in the constructed multi-layer model, the three subgraphs can be connected to each other with three types of edges:

(1) Edges from the dependency subgraph to the configuration subgraph: An edge between a component in the dependency subgraph and a Class 1 vertex in the configuration subgraph represents the list of configuration parameters associated with that component. There are no edges between the dependency subgraph and Class 2 vertices in the configuration subgraph.

(2) Edges from the configuration subgraph to the vulnerability subgraph: An edge between a Class 2 node in the configuration subgraph and a vertex in the attack subgraph (i.e., a vulnerability) implies that the relationship expressed in the Class 2 vertex satisfies a precondition for that vulnerability.

(3) Edges from the vulnerability subgraph to the dependency subgraph: An edge between a vertex in the attack subgraph (i.e., a vulnerability) and a vertex in the dependency subgraph (i.e., a system component) represents the amount of degradation (i.e., exposure factor) of the component due to exploitation of the vulnerability and ranges from 0 to 1. As an example, multi-layer graph 230 of FIG. 2B indicates that the debug mode must be set to false for both $h_A$ and $h_C$.

Thus, the modeling framework can store relationships between system components, configuration parameters, configuration predicates, and vulnerabilities in a queryable, graph-based form. The modeling framework can also provide an application programming interface (API) to quantitatively evaluate the security of different system configurations using topological vulnerability analysis (e.g., by assessing and calculating the impact of one or more attack paths). The modeling framework can be built using a graph database platform, such as Neo4j, and the modeling framework can convert all ingested information into a graphical format. The modeling framework APIs which provide security evaluation and configuration impact analysis may be implemented as a Neo4j plug-in, which can: analyze attack scenarios (i.e., finite sequences of vulnerabilities that can be exploited by an attacker); (ii) compute various attack surface metrics; and (iii) assess the security impact of configuration changes, as described below.

Exemplary Graphical Display of a Multi-Layer Graph

Figure 3:
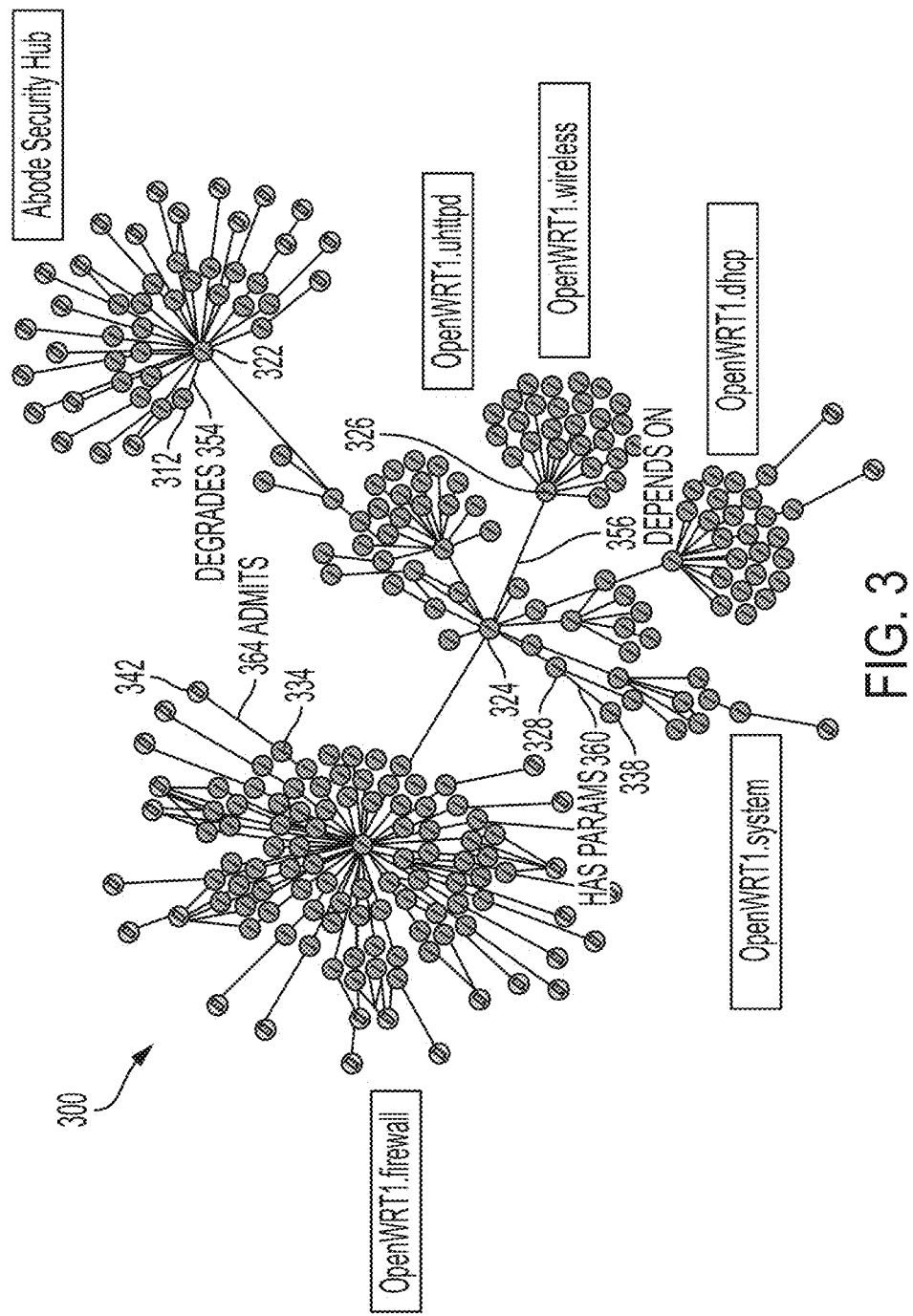
FIG. 3 illustrates an exemplary graphical display of a multi-layer graph, in accordance with an embodiment of the present application.

FIG. 3 illustrates an exemplary graphical display 300 of a multi-layer graph, in accordance with an embodiment of the present application. Graphical display 300 can include part of a multi-layer graph corresponding to sample testbed data. In graphical display 300, the red circles correspond to nodes in the vulnerability subgraph, the blue circles corresponds to nodes in the dependency subgraph, the green circles correspond to a first class of nodes (configuration parameters) in the configuration subgraph, and the yellow circles correspond to a second class of nodes (configuration constraints) in the configuration subgraph.

A directed edge from a red vulnerability subgraph node to a blue dependency subgraph node indicates that the vulnerability subgraph node degrades or causes a degradation of the dependency subgraph node. For example, vulnerability subgraph node 312 degrades (354) or represents the exposure factor of the component indicated by dependency subgraph node 322 based on the exploitation of vulnerability 312. A directed edge from a first dependency subgraph node to a second dependency subgraph node indicates that the first dependency subgraph node depends on the second dependency subgraph node. For example, dependency subgraph node 324 depends on (356) dependency subgraph node 326.

A directed edge from a dependency subgraph node to a configuration subgraph node of the first class (i.e., a configuration parameter) indicates that the dependency subgraph node is associated with or has parameters indicated by the configuration subgraph node of the first class. For example, dependency subgraph node 328 is associated with or has parameters (360) indicated in node 338. Furthermore, a directed edge from a Class 1 configuration subgraph node (i.e., a configuration parameter) to Class 2 configuration subgraph node (i.e., a configuration constraint) indicates that the Class 1 node identifies or admits the configuration parameters involved in the configuration constraint. For example, Class 1 configuration subgraph node 334 identifies or admits (364) the relationship of the configuration parameters involved in Class 2 configuration subgraph node 342.

Note that in exemplary graphical display 400 of FIG. 4, the use of the same numbers to identify nodes in the three subgraphs as well as directed edges within and between nodes in the three subgraphs is provided to demonstrate each node, pair of nodes, or relationship between nodes as directed edges. The exemplary nodes and relationships described in relation to the partial multi-layer graph of FIG. 3 are intended to provide a larger view of a displayed multi-layer graph. The text associated with each colored node and directed edge need not be clearly visible for purposes of illustrating the displayed multi-layer graph.

Thus, nodes in the configuration subgraph can encode information associated with a configuration parameter for a respective component ("Class 1 node") and can also encode relationships between configuration parameters, including: relationships among configuration parameters within components; and relationships among configuration parameters across components ("Class 2 node").

Nodes in the vulnerability subgraph can encode: known vulnerabilities associated with a component; bad security practices; and a negation of best security practices (i.e., "not-best security practices"). A directed edge from a first vulnerability subgraph node to a second vulnerability subgraph node can indicate that exploiting the first vulnerability subgraph node creates the preconditions for exploiting the second vulnerability subgraph node.

Nodes in the dependency subgraph can represent a respective component of the system and be labeled with a dependency type and a number representing a value associated with the respective component. A directed edge between a first dependency subgraph node and a second dependency subgraph node can indicate a dependency between two respective components, e.g., that a first dependency subgraph node depends on a second dependency subgraph node.

Furthermore, an edge between a component in the dependency subgraph and a Class 1 node in the configuration subgraph represents the list of configuration parameters associated with that component. An edge between a Class 2 node in the configuration subgraph and a vertex in the vulnerability subgraph (i.e., a vulnerability) implies that the relationship expressed in the Class 2 vertex satisfies a precondition for that vulnerability. An edge between a vertex in the attack subgraph (i.e., a vulnerability) and a vertex in the dependency subgraph (i.e., a system component) represents the amount of degradation (i.e., exposure factor) of the component due to exploitation of the vulnerability and ranges from 0 to 1.

High-Level Summary of Reasoning Framework

The embodiments described herein provide an overall system which aims to find configurations that minimize security impact while satisfying configuration constraints and preserving the functionality of the distributed system. In the overall system, the reasoning framework can compute these secure configurations based on satisfying configuration subgraph constraints, satisfying dependency subgraph constraints, and minimizing the security impact of all paths. Without loss of generality, the reasoning framework can denote the $i^{th}$ configuration parameter as $f_i$ and the entire configuration by $F=(f_1, f_2, \ldots, f_k)$. At a high level, this constraint satisfaction problem (CSP) can be solved based on the following:

Find configuration $F=(f_1, f_2, \ldots, f_k)$ such that:
1) Configuration subgraph constraints are satisfied;
2) Dependency subgraph constraints are satisfied;
3)

$$F^* = \underset{F}{\operatorname{argmin}} \sum_{P \in A(F)} \operatorname{impact}(P) \qquad \text{Equation (1)}$$

where $P=(v_1, v_2, \ldots, v_n)$ is any path in the vulnerability subgraph A (F)=induced by the configuration F.

The reasoning framework can obtain F* using a solver, such as a Satisfiability Modulo Theory (SMT) solver or a Satisfiability (SAT) solver. Dependency subgraph constraints and configuration subgraph constraints can be derived from the modeling framework, and subsequently provided as inputs to the solver, as described below. The solver can also take as input the initial system configuration F, which can be assumed to correspond to parameter settings that place the system in a working state (although the initial system configuration F may not be optimal with respect to security or functionality). The goal of the reasoning framework (via the solver) is to find a configuration that improves the security and/or functionality.

While solving the CSP, the reasoning framework may encounter combinations of constraints that cannot be simultaneously satisfied (i.e., are "mutually incompatible"). Some of the constraints therefore must be carefully relaxed. The reasoning framework can perform this relaxation step-by-step based on to a predefined strategy that balances/prioritizes: security over functionality; functionality over security; or neither.

Recall that based on the input of the multi-layer graph, the reasoning framework can determine constraint relationships associated with configuration parameters for the components. These constraint relationships can include both functionality constraints and security constraints. Examples of security constraints can include information associated with the dependency subgraph and the configuration subgraph, including: a connectivity between components; a configuration parameter for a respective component; a first relationship between configuration parameters associated with a single component; and a second relationship between configuration parameters associated with a pair of components.

Examples of security constraints can include information associated with at least the vulnerability subgraph and the configuration subgraph, including: a positive expression of known security vulnerabilities or a negation of predicates corresponding to the known security vulnerabilities, wherein the known security vulnerabilities are obtained from a public or a proprietary database; a positive expression of bad security practices (e.g., "Type-2" vulnerabilities) or a negation of predicates corresponding to the bad security practices; and a positive expression of best security practices (e.g., "Type-3" vulnerabilities) or a negation of predicates corresponding to the best security practices.

The overall system can use both the positive expression of certain vulnerabilities and the negation of predicates corresponding to certain vulnerabilities depending on which framework is involved. For the data ingestion framework, the system can identify both the functionality and security constraints. Either a positive expression (e.g., of a functionality constraint) or a negation of predicates corresponding to a certain vulnerability (e.g., "not-best security practices") can provide the system with the information needed to execute the data ingestion framework and the modeling framework. The reasoning framework may use either the positive or the negative expression, depending on the functionality constraint or security constraints.

Design and Exemplary Implementation of the Reasoning Framework

The reasoning framework can compute a new configuration for the target system, across all components of the target system, where the computed configuration minimizes security risk while preserving functionality. The reasoning framework can construct the Constraint Satisfaction Problem (CSP) based on the multi-layer graph as input.

Each of the three requirements of the CSP of Equation (1) can correspond to information indicated and associated with each of the three subgraphs of the multi-layer graph. For example, the variables in the CSP of Equation (1) can correspond to unique names of nodes of the model representing configuration parameters. In addition, the CSP can include the following types of constraints derived from the modeling framework: (1) CurrentConfig constraints, i.e., predicates which represent the assignment of current values to system parameters; (2) Functional constraints, which include predicates consisting of functionality requirements as discussed above; and (3) Security constraints of two types: (a) negation of predicates which represent preconditions for Type-2 vulnerabilities (i.e., bad security practices) and (b) predicates that represent preconditions for enabling best security practices (i.e., to prevent Type-3 vulnerabilities).

The reasoning framework can input the formulated CSP problem into an SMT solver (such as Microsoft Z3) to obtain a solution with values for each parameter. Note that one assumption is that the initial system configuration has been at least partially tested for functional and non-functional requirements, and the initial system configuration can represent a reasonable starting point from which to find optimal configurations. Thus, the CSP problem uses the CurrentConfig constraints.

In cases where the CurrentConfig constraints are suboptimal or violate security or functionality constraints, the reasoning framework can make necessary adjustments in the CSP, based on the desired reasoning strategy (i.e., prioritizing functionality, prioritizing security, or neither, as described below). The formulated CSP may not be satisfiable. That is, the resulting unsat core cannot be returned as empty after a certain number of iterations by the solver to resolve the mutually incompatible constraints. In many cases, however, the solver can return an unsatisfiable core ("unsat core"), which consists of a set of clauses whose conjunction is still unsatisfiable. If the formulated CSP is not satisfiable and returns an unsat core, the reasoning framework can utilize, in a next iteration, the unsat core information along with the constraint type and constraint impact information (e.g., by querying the modeling framework) to form a new CSP. The reasoning framework can achieve this by dropping certain clauses from the unsat core of the previous CSP based on the constraint relaxation strategy of the overall system (i.e., of SCIBORG), as described below. The reasoning framework can perform this operation for a number n of rounds or iterations until the CSP is satisfied, the number of trials exceeds n, or the solver fails to produce both the unsat core and a solution.

Constraint Relaxation Strategy

The reasoning framework can be configured to use one of three predefined strategies in the reasoning process: (1) Prioritize Functionality; (2) Prioritize Security; and (3) No Priority. These three strategies differ in the way that constraint relaxation occurs in the event of unsatisfiability of a CSP formulated in a previous reasoning round (i.e., in the event of a non-empty unsat core). If the employed strategy (or mode) is "Prioritize Functionality," the reasoning framework can form a new CSP by first removing constraints of type CurrentConfig that appear in the unsat core of the previous CSP. If the problem is still not satisfiable, the reasoning framework can remove constraints of type Security with the smallest security impact.

If the employed strategy (or mode) is "Prioritize Security," the reasoning framework can form a new CSP by first removing constraints of type CurrentConfig that appear in the unsat core of the previous CSP. If the problem is still not satisfiable, the reasoning framework can remove Functional constraints. Note that the recommended configuration found under this mode may violate functional requirements and therefore should not be used for deployment. However, it may be useful in analysis and to further understand the system requirements and their trade-offs with security.

If the employed strategy (or mode) is "No Priority," the reasoning framework can remove constraints of type CurrentConfig that appear in the unsat core of the previous CSP. If the problem is still unsatisfiable, the reasoning frame can report the unsat core and exit.

The system (or a user) may select or use a particular strategy based on an operational context of the overall system. For example, if the overall system is a ship in an operational context of "at sea," the system may determine to select or use the strategy which prioritizes functionality over security, because it may be deemed to be more essential to have a working system with properly functioning component over protecting the security of those components. On the other hand, if the ship is an operational context of "dry dock" or "not at sea" or "not active," the system may determine to select or use the strategy which prioritizes security over functionality, because protecting the security of the system while the system is in dry dock or non-operational may be deemed to be more essential than ensuring the functionality or operation of the system.

Order of Pair Analysis, Termination Conditions, and Exemplary User Displays

The reasoning framework can compute the unsat core, and can resolve, based on a strategy and over multiple iterations, the unsat core by analyzing one pair of mutually incompatible constraints (in the set of mutually incompatible constraints) per respective iteration, as described below in relation to FIGS. 5, 6A, and 6B. The reasoning framework can analyze pairs of mutually incompatible constraints from the set in an order based on the utilized application. In some embodiments, the reasoning framework can determine an order for the analyzed pairs based on various factors, including: a strategy for the overall system; a specific strategy for a respective component; a specific strategy for a subset of components to which the respective component belongs; a weighted or assigned value associated with each security or functionality constraint; an algorithm based on information associated with or indicated by the multi-layer graph; probability values with a vulnerability subgraph node; exposure factors associated with a vulnerability subgraph node and a dependency subgraph node; and any information associated with a node or edge in or between the three subgraphs of the multi-layer graph.

The reasoning framework can also detect a termination condition, that is, a condition which triggers a termination of the solver in performing, calculating, or running the multiple iterations. The termination condition can be based on, e.g.: reaching a number of n of the multiple iterations, wherein the number n is configured or determined by a user of the system or set as a default by the system; exceeding the number n of the multiple iterations; and determining a failure to produce an empty unsat core.

Upon termination of the iterations, the system can determine whether the unsat core is empty. If the resulting unsat core is empty, the system can determine that resolving the unsatisfiable core based on the strategy and over multiple iterations results in an empty unsatisfiable core and a set of mutually compatible constraints. The system can display, on the screen of a user device, information as indicated in FIG. 4A.

If the resulting unsat core is not empty, the system can determine that resolving the unsat core based on the strategy and over multiple iterations results in a non-empty unsat core which comprises a remaining set of mutually incompatible constraints. The system can display, on the screen of a user device, information as indicated in FIG. 4B.

Figure 4A:
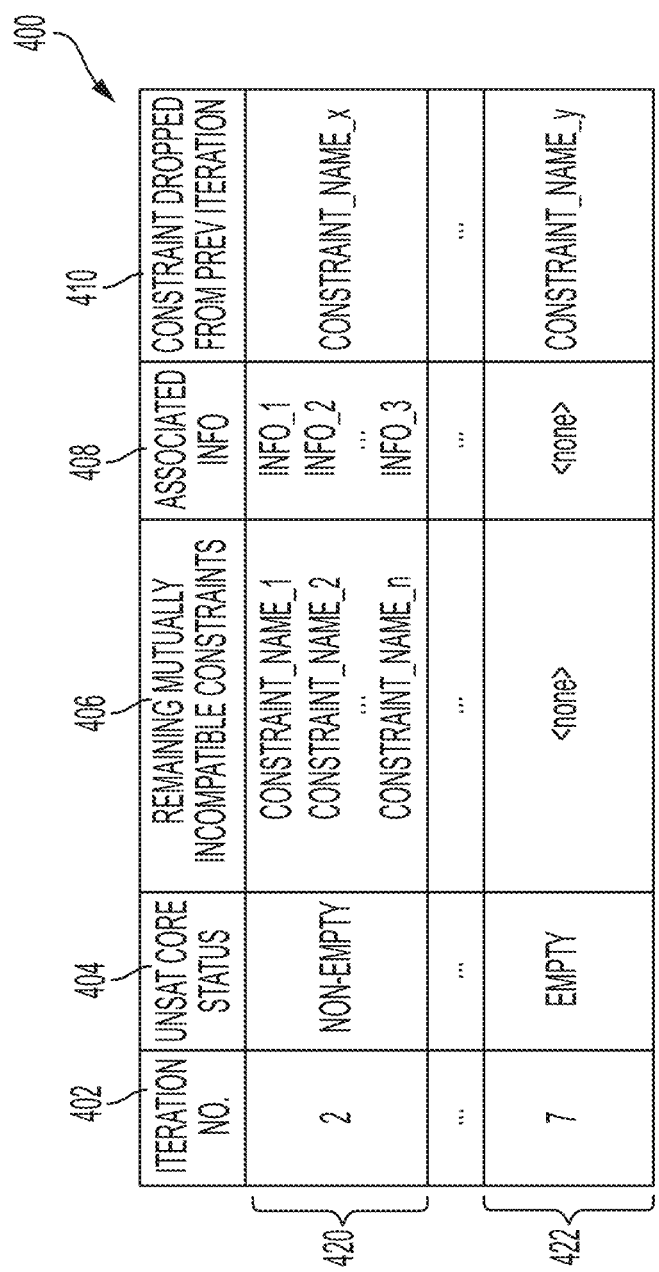
FIG. 4A illustrates an exemplary display on a user device, including the results after one or more iterations of resolving the unsatisfiable core, in accordance with an embodiment of the present application.

FIG. 4A illustrates an exemplary display 400 on a user device, including the results after one or more iterations of resolving the unsatisfiable core, in accordance with an embodiment of the present application. Display 400 can include one or more interactive elements which allow the user to view information, including, for each round or iteration: an iteration number 402; a status of the unsat core 404 (e.g., empty or non-empty); remaining mutually incompatible constraints 406; information associated with each remaining mutually incompatible constraint (associated info) 408; and an indicator of a constraint dropped from a previous iteration 410. The set or list of remaining mutually incompatible constraints can be indicated by a constraint name and can include an entire list of the remaining mutually incompatible constraints, or can include only a pair of mutually incompatible constraints which are compared or analyzed in the respective iteration. Associated information 408 can include information such as the value of a security impact for the respective constraint and the goal of the constraint (e.g., negation of a bad security practice, maintaining the current configuration, etc.).

For example, a row 420 can include or indicate: an iteration number of "2"; an unsat core status of "non-empty"; a list of remaining mutually incompatible constraints by name {Constraint_Name_1, Constraint_Name_2, . . . , Constraint_Name_n}; associated information for the remaining mutually incompatible constraints {Info_1, Info 2, . . . , Info_n}; and a constraint dropped from a previous iteration of "Constraint_Name_x." A row 422 can include or indicate: an iteration number of "7"; an unsat core status of "empty"; "none" or an empty or null value for the list of remaining mutually incompatible constraints; "none" or an empty or null value for the associated information; and a constraint dropped from a previous iteration of "Constraint_Name_y."

For each pair of mutually incompatible constraints, the reasoning framework can resolve the incompatibility by selecting one constraint and dropping the other constraint based on the selected strategy (e.g., prioritizing security over functionality, prioritizing functionality over security, or maintaining the current configuration). In each iteration, the reasoning framework can select the pairs of mutually incompatible constraints based on an ordered list of the mutually incompatible constraints in the unsat core. The list may be ordered randomly or may be sorted based on an underlying application. In some embodiments, the reasoning framework may order or sort the list based on an algorithm or other strategy prior to beginning the reasoning for the multiple iterations, as described above. The reasoning framework may also dynamically sort the list during the multiple iterations based on the algorithm or other strategy, e.g., before or after one or more of the iterations.

FIG. 4B illustrates an exemplary display 430 on a user device, including the results of unsuccessfully resolving the unsatisfiable core, in accordance with an embodiment of the present application. Display 430 is similar to display 400, but includes a final iteration which indicates a non-empty unsat core, and also includes both associated information and/or a reason 418 for each mutually incompatible constraint. That is, associated information/reason 418 can indicate either or both of the information associated with a remaining mutually incompatible constraint (as described above in relation to associated information 408 in display 400) and a reason for a remaining mutually incompatible constraint.

For example, a row 440 can be similar to row 420 of display 400, and can include or indicate: an iteration number of "2"; an unsat core status of "non-empty"; a list of remaining mutually incompatible constraints by name {Constraint_Name_1, Constraint_Name_2, . . . , Constraint_Name_n}; associated information for the remaining mutually incompatible constraints {Info_1, Info_2, . . . , Info_n}; and a constraint dropped from a previous iteration of "Constraint_Name_x." A final row 442 can include or indicate: an iteration number of "9"; an unsat core status of "non-empty"; a list of remaining mutually incompatible constraints by name {Constraint_Name_4, Constraint_Name_5, . . . , Constraint_Name_m}; associated information or a reason for the remaining mutually incompatible constraints {Reason_4, Reason_5, . . . , Reason_m}; and a constraint dropped from a previous iteration of "Constraint_Name_z."

Figure 5:
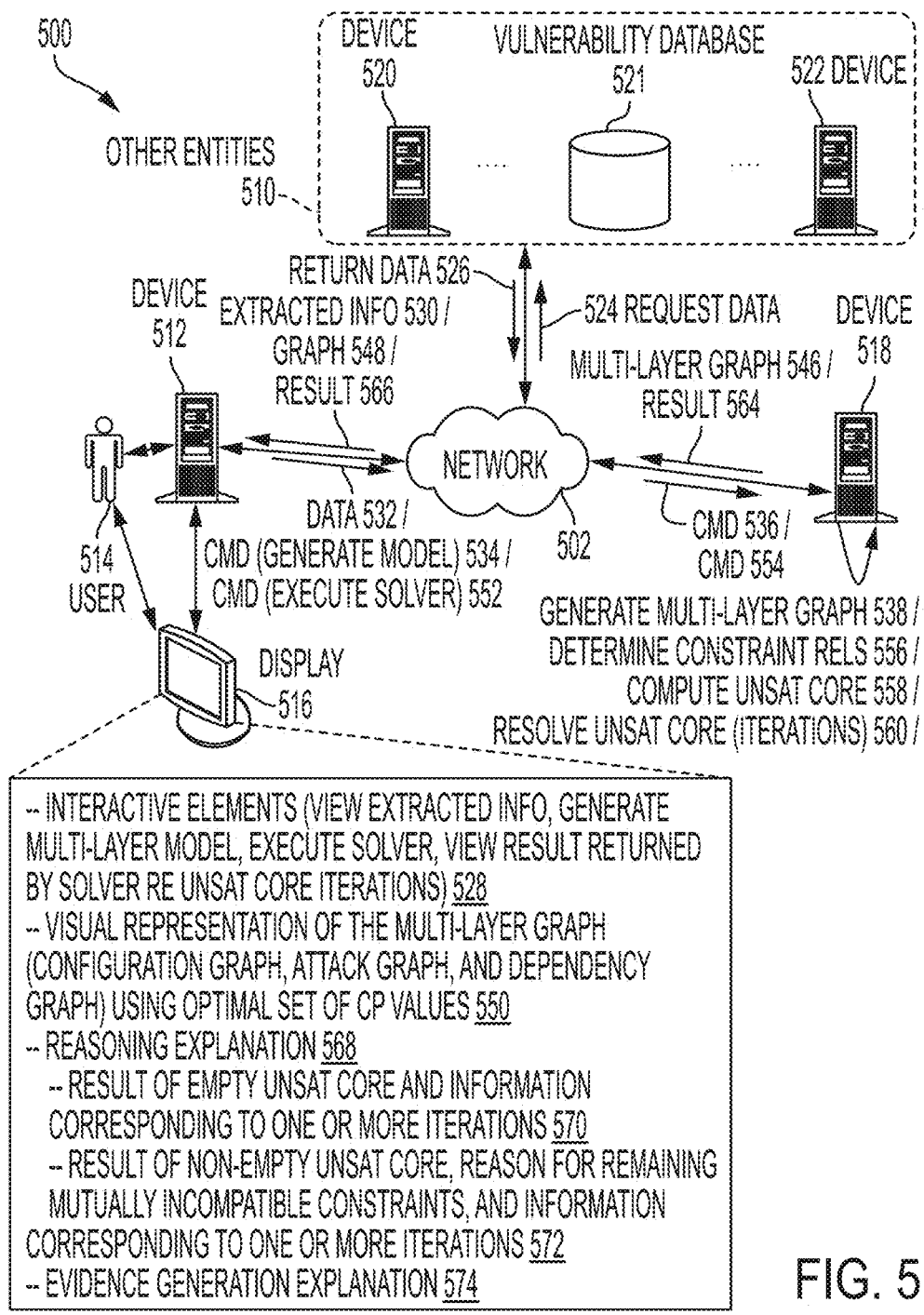
FIG. 5 depicts an exemplary environment for reasoning about the optimality of a configuration parameter of a distributed system, in accordance with an embodiment of the present application.

Exemplary Environment for Reasoning about the Optimality of a Configuration Parameter in a Distributed System FIG. 5 depicts an exemplary environment 500 for reasoning about the optimality of a configuration parameter of a distributed system, in accordance with an embodiment of the present application. Environment 500 can include: a device 512, an associated user 514, and an associated display 516; other entities 510; and a device 518. Other entities 510 can include a plurality of devices and data stored in the plurality of devices, e.g., a device 520 (which can include an associated storage device, not shown), a vulnerability database 521 (e.g., NVD), and a device 522. Other entities 510 can also include data determined by or obtained from IoT search engines, such as Shodan (not shown) and other public or proprietary databases. Devices 512 and 518 can communicate with each other and with other entities 510 via a network 502. Device 518 can be a server, a computing device, or any device which can perform the functions described herein.

During operation, device 512 or device 518 (or another device, not shown) can send a command to request data 524 from other entities 510. Other entities 510 can return the requested data (via a return data 526 communication). As described in U.S. patent application Ser. No. 16/918,966, upon receiving the requested data, device 518 can ingest the data, normalize the ingested data, and extract information from the ingested data. Device 518 can return the extracted information (as extracted information 530) to, e.g., a requesting host or client or user.

Device 512 can receive extracted information 530, and can display on the screen of display 516 interactive elements 528 (which allow user 514 to, e.g., view the extracted information and generate the multi-layer model). User 514 can select an interactive element on display 516, which corresponds to a command to generate the multi-layer module. For example, user 514 can send a command 534 (to generate the multi-layer model) along with data 532 (i.e., extracted information 530) to device 518 via network 502. Device 518 can receive command 534 (as a command 536), and generate a multi-layer graph 538, as described in U.S. patent application Ser. No. 16/918,971. Device 518 can return a multi-layer graph 546 back to device 512.

Device 512 can receive graph 546 (as a graph 548), and can display on the screen of display 516 at least: interactive elements 528 (which allow the user to, e.g., execute the solver); and a visual representation of the multi-layer graph (configuration graph, attack graph, and dependency graph) using an optimal set of configuration parameter values 550.

User 514 can select an interactive element on display 516, which corresponds to a command 552 to execute the solver. Device 518 can receive command 552 (as a command 554), and perform the following operations: determine constraint relationships 556; compute the unsat core 558; and resolve the unsat core 560 (via multiple iterations and based on a predefined strategy). Device 518 can return a result 564 back to device 512.

Device 512 can receive result 564 (as a result 566), and can display on the screen of display 516 at least: interactive elements 528 (which allow the user to, e.g., view the result returned by the solver regarding the unsat core iterations); a reasoning explanation 568; and an evidence generation explanation. Reasoning explanation 568 can include: a result of an empty unsat core and information corresponding to one or more iterations of the solver 570; and a result of a non-empty unsat core, a reason for any remaining mutually incompatible constraints, and information corresponding to one or more iterations 572. Reasoning explanation 568 can also include information as described above in relation to FIGS. 4A and 4B.

User 514 can continue to receive extracted information, view the extracted information, send commands to generate the multi-layer model for display, and view the generated multi-layer graph. User 514 can also review any recommended or changed constraints or configuration parameters, which can be displayed on display 516. User 514 can continue to send commands to re-generate the multi-layer graph based on current constraints and configuration parameters (e.g., as recommended by the system or as set by the user), and to re-run the solver based on the re-generated multi-layer graph. An exemplary displayed result of an empty unsat core and associated information is depicted above in relation to FIG. 4A, while an exemplary displayed result of a non-empty unsat core and associated information is depicted above in relation to FIG. 4B.

Thus, environment 500 depicts the reasoning framework, which includes resolving any mutually incompatible constraints returned in an unsat core by the solver, based on the generated multi-layer model, which is based on data ingested and extracted from multiple sources. In outputting the multi-layer graph and the security impact to the reasoning framework, the system can also output a setting which indicates a priority of functionality, security, or neither. The setting can be set by a user or configured by the system or set at a default value, and can be subsequently passed downstream to the reasoning framework. The setting can also be a weighted value which indicates a ratio or percentage of the relative importance of functionality versus security for the overall system. The setting can further be assigned to one or more components of the system, e.g., as a plurality, group, or set of components.

Figure 6A:
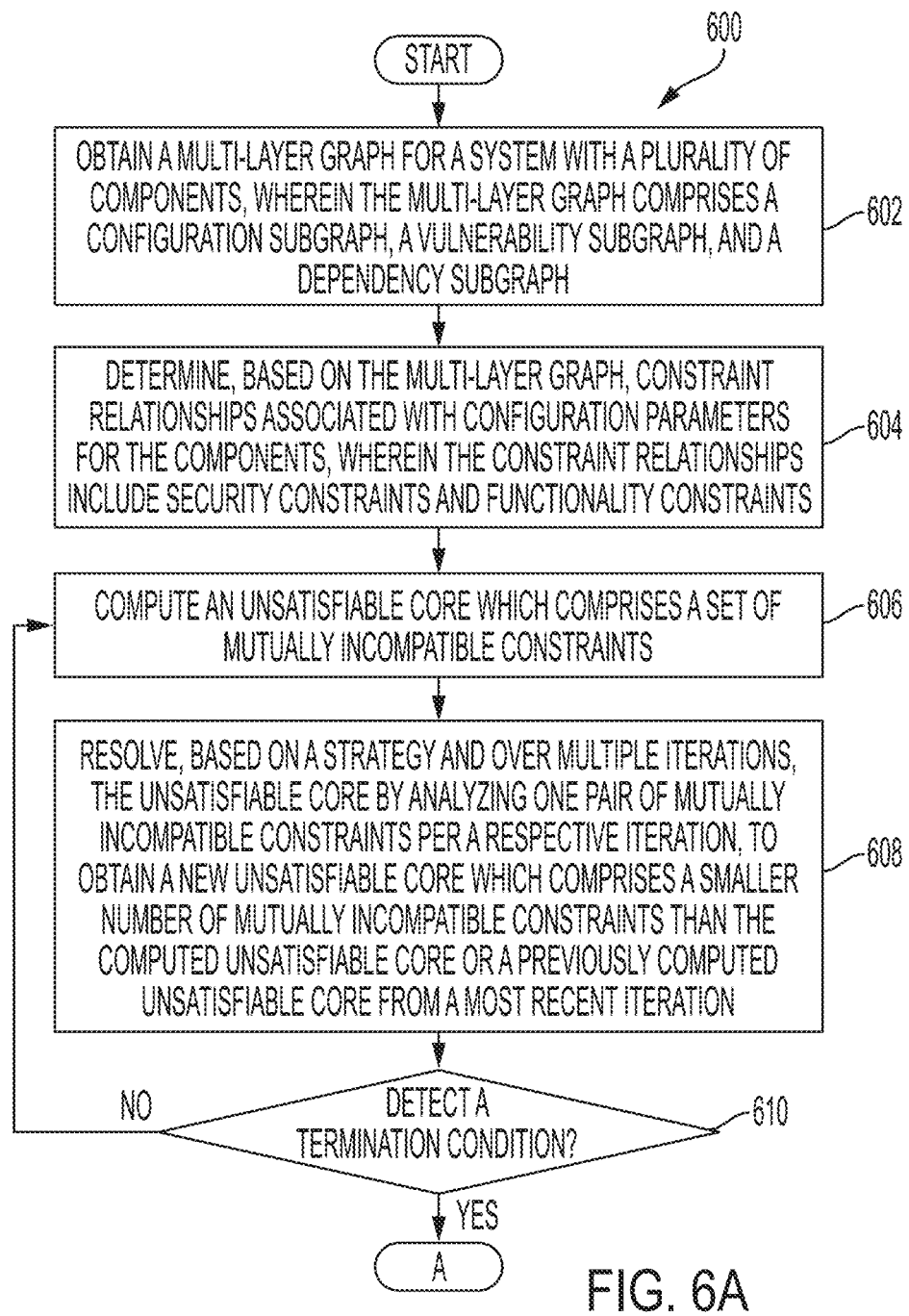
FIG. 6A presents a flow chart illustrating a method for reasoning about the optimality of a configuration parameter of a distributed system, in accordance with an embodiment of the present application.

Exemplary Method for Reasoning about the Optimality of a Configuration Parameter in a Distributed System FIG. 6A presents a flow chart 600 illustrating a method for reasoning about the optimality of a configuration parameter of a distributed system, in accordance with an embodiment of the present application. During operation, the system obtains a multi-layer graph for a system with a plurality of components, wherein the multi-layer graph comprises a configuration subgraph, a vulnerability subgraph, and a dependency subgraph (operation 602). The system determines, based on the multi-layer graph, constraint relationships associated with configuration parameters for the components, wherein the constraint relationships include security constraints and functionality constraints (operation 604). The functionality constraints can positively express functionality requirements associated with the components based on one or more of: a connectivity between components; a configuration parameter for a respective component; a first relationship between configuration parameters associated with a single component; and a second relationship between configuration parameters associated with a pair of components. The security constraints can include one or more of: a positive expression of known security vulnerabilities or a negation of predicates corresponding to the known security vulnerabilities, wherein the known security vulnerabilities are obtained from a public or a proprietary database; a positive expression of bad security practices or a negation of predicates corresponding to the bad security practices; and a positive expression of best security practices or a negation of predicates corresponding to the best security practices.

The system computes an unsatisfiable core which comprises a set of mutually incompatible constraints (operation 606). The system resolves, based on a strategy and over multiple iterations, the unsatisfiable core by analyzing one pair of mutually incompatible constraints per a respective iteration, to obtain a new unsatisfiable core which comprises a smaller number of mutually incompatible constraints than the computed unsatisfiable core or a previously computed unsatisfiable core from a most recent iteration (operation 608). The system can resolve the unsatisfiable core based on the strategy and over multiple iterations based on one or more of: an operational context of the system; improving a current configuration of the system without prioritizing security over functionality or functionality over security; preserving constraints which prioritize security over functionality; and preserving constraints which prioritize functionality over security. In some embodiments, the system can assign a different strategy to different subsets of the components of the system. For example, the system can divide the components of the system into subsets of components, assign a strategy to each subset (e.g., prioritize functionality over security, prioritize security over functionality, or prioritize neither), and employ the assigned strategy in the multiple iterations of resolving the unsatisfiable core.

If the system does not detect a termination condition (decision 610), the operation continues at operation 606 (continue resolving the unsatisfiable core). If the system detects a termination condition (decision 610), the operation continues at Label A of FIG. 6B.

Figure 6B:
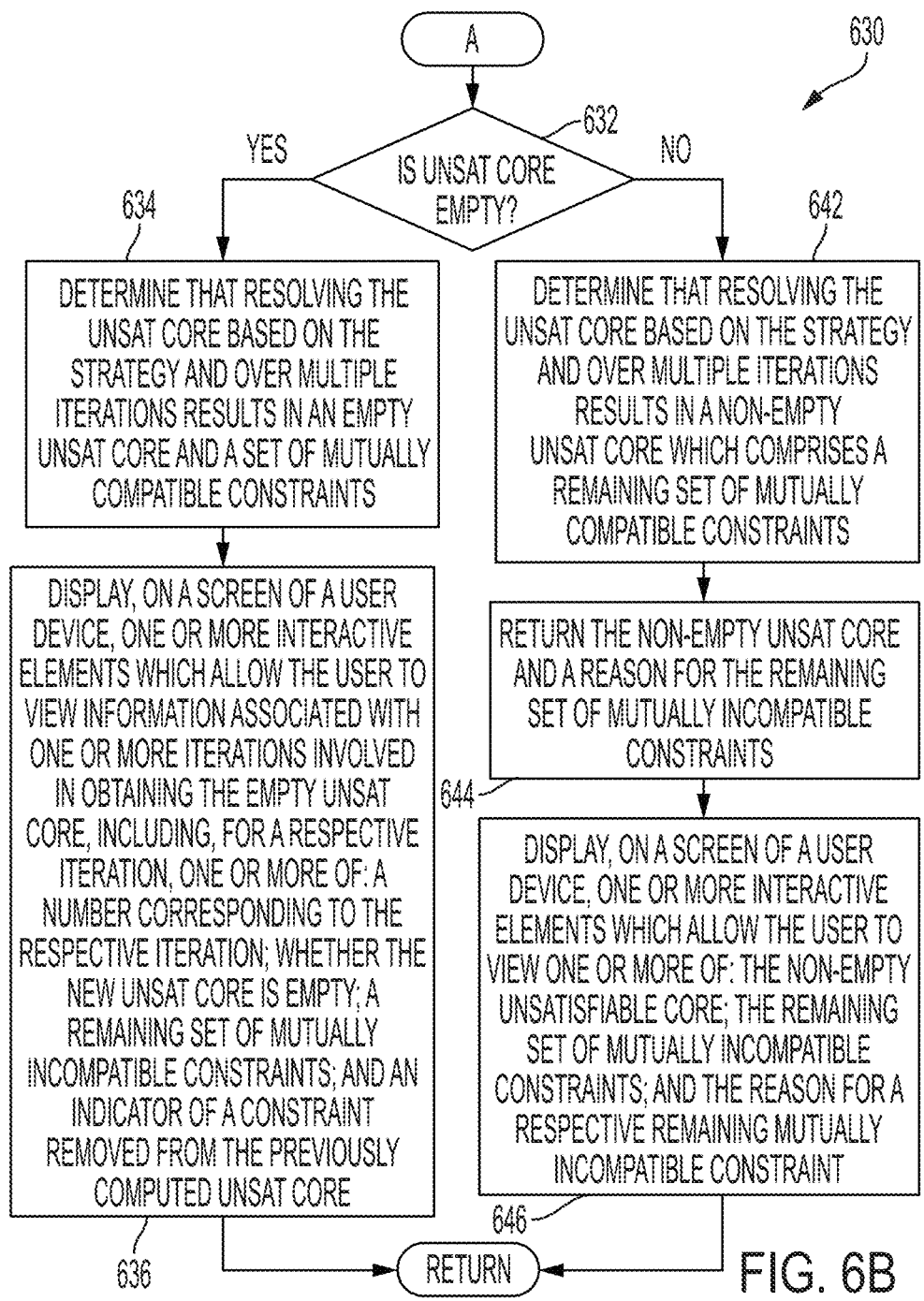
FIG. 6B presents a flow chart illustrating a method for reasoning about the optimality of a configuration parameter of a distributed system, in accordance with an embodiment of the present application.

FIG. 6B presents a flow chart 630 illustrating a method for reasoning about the optimality of a configuration parameter of a distributed system, in accordance with an embodiment of the present application. If the system determines that the unsat core is empty (decision 632), the system determines that resolving the unsatisfiable core based on the strategy and over multiple iterations results in an empty unsatisfiable core and a set of mutually compatible constraints (operation 634). The configuration parameters which satisfy the mutually compatible constraints are associated with a desired output configuration. The system displays, on a screen of a user device, one or more interactive elements which allow the user to view information associated with one or more iterations involved in obtaining the empty unsat core, including, for a respective iteration, one or more of: a number corresponding to the respective iteration; whether the new unsatisfiable core is empty; a remaining set of mutually incompatible constraints; and an indicator of a constraint removed from the previously computed unsatisfiable core (operation 636), and the operation returns.

If the system determines that the unsat core is not empty (decision 632), the system determines that resolving the unsatisfiable core based on the strategy and over multiple iterations results in a non-empty unsatisfiable core which comprises a remaining set of mutually incompatible constraints (operation 642). The system returns the non-empty unsatisfiable core and a reason for the remaining set of mutually incompatible constraints (operation 644). The system displays, on a screen of a user device, one or more interactive elements which allow the user to view one or more of: the non-empty unsatisfiable core; the remaining set of mutually incompatible constraints; and the reason for a respective remaining mutually incompatible constraint (operation 646), and the operation returns.

Note that while the system determines whether the unsat core is empty after detecting a termination condition, the termination condition could be determining that the unsat core is empty. The system can also terminate the multiple iterations of resolving the unsatisfiable core (i.e., detect a termination condition) based on one or more of: reaching a number of the multiple iterations, wherein the number is configured by a user of the system or set as a default by the system; exceeding the number of the multiple iterations; and determining a failure to produce an empty unsatisfiable core.

No Known Approaches for the Described Functions/Embodiments; Improvements to Functioning of Computer; Improvements to Technical Fields There are currently no known systems or approaches for achieving or performing the above-described functions or embodiments. While current approaches may provide information about security vulnerabilities present in the configurations of individual components of a composed system, there is currently no known system or approach which provides a way to optimize the configuration so as to improve the overall security/functionality balance of the entire system. Specifically, there is currently no established way to extract configuration parameter values and normalize them for ingestion into the configuration graph. Furthermore, there are currently no known principled approaches to extract and define constraint relationships between configuration parameters of the same device, or of different devices, and to expose these relationships to an optimization algorithm.

Moreover, there are currently no known approaches which use a solver to optimize configurations of composed IoT systems or other distributed systems. There are also no known approaches which address situations in which the solver determines that certain constraints are mutually incompatible, and subsequently relaxes some of the mutually incompatible constraints based on a strategy (such as prioritizing functionality over security, prioritizing security over functionality, or neither), where the strategy is based on an operational context of the distributed system. That is, there is currently no known approach to achieve a user-configured or system-configured balance between security and functionality in a composed system (e.g., a distributed system with a plurality of components).

The embodiments described herein of the reasoning framework provide a system which facilitates reasoning about the optimality of a configuration parameter of a distributed system. The reasoning framework uses a solver to compute a new configuration for the distributed system, across all components of the distributed system, which preserves functionality or security or both, based on an operational context of the distributed system. The solver of the reasoning framework can compute the new configuration over multiple iterations by resolving an unsatisfiable core of mutually incompatible constraints, as described above in relation to FIG. 5. The reasoning framework can also generate information which is returned and displayed on the screen of a user device, as described above in relation to FIGS. 4A and 4B. The reasoning framework can provide the generated information, as well as the multi-layer graph constructed by the modeling framework and the information extracted by the data ingestion framework, to the evidence generation framework.

Given a composed system (such as an IoT system), the embodiments described herein can optimize the configuration of the system components by leveraging the complex relationships among the configuration parameters of the individual system components, which can result in improving the overall security and functionality balance of the entire system. Furthermore, the embodiments described herein provide an improvement over the existing state of the art in the computer technology field of providing security for a system of networked components, and also for optimizing the provided security.

The disclosed system includes a system of networked components (e.g., a composed system which is an IoT system), where each component may be a computing device with different configuration parameters and which may interact differently with the other networked components (or computing devices). Each component may also have different security and functionality parameters. The disclosed system is thus directed to a solution which is both necessarily rooted in computer technology and provides a specific implementation of a solution to a problem in the software arts. Furthermore, the disclosed system can enhance the functioning of the computer system itself, because optimizing the configuration of the system components can improve the balance between the security and the functionality of the overall composed system, which necessarily enhances the functioning of each individual networked component in the overall system. By providing a more secure system which is less prone to attack, the described embodiments can thus enhance the functioning of the computer system itself (as well as the networked components of the composed system), in terms of security, performance, and efficiency.

Furthermore, the described embodiments may be integrated into many different practical applications, e.g., used in many technical fields and for many different applications. Some exemplary systems include: a home IoT security system; a smart grid and microgrid security system; security relating to Navy ships, military aircraft, and Department of Defense (DoD) systems; security of networked critical infrastructure, such as dams, hospitals, and transportation networks; and enterprise security for networks of computers, printers, and mobile devices. Examples of primary users include: operators of DoD systems; operators and system administrators of distributed system and enterprise networks; security and information technology (IT) administrators for medium-to-large enterprises; and any users of the above listed exemplary systems.

Thus, the improvements provide by the disclosed system apply to several technologies and technical fields, including but not limited to: security of networked components; configuration security; cyber-physical system security; balancing security and functionality of networked components in an IoT system; and machine data analytics.

Exemplary Distributed Computer System

Figure 7:
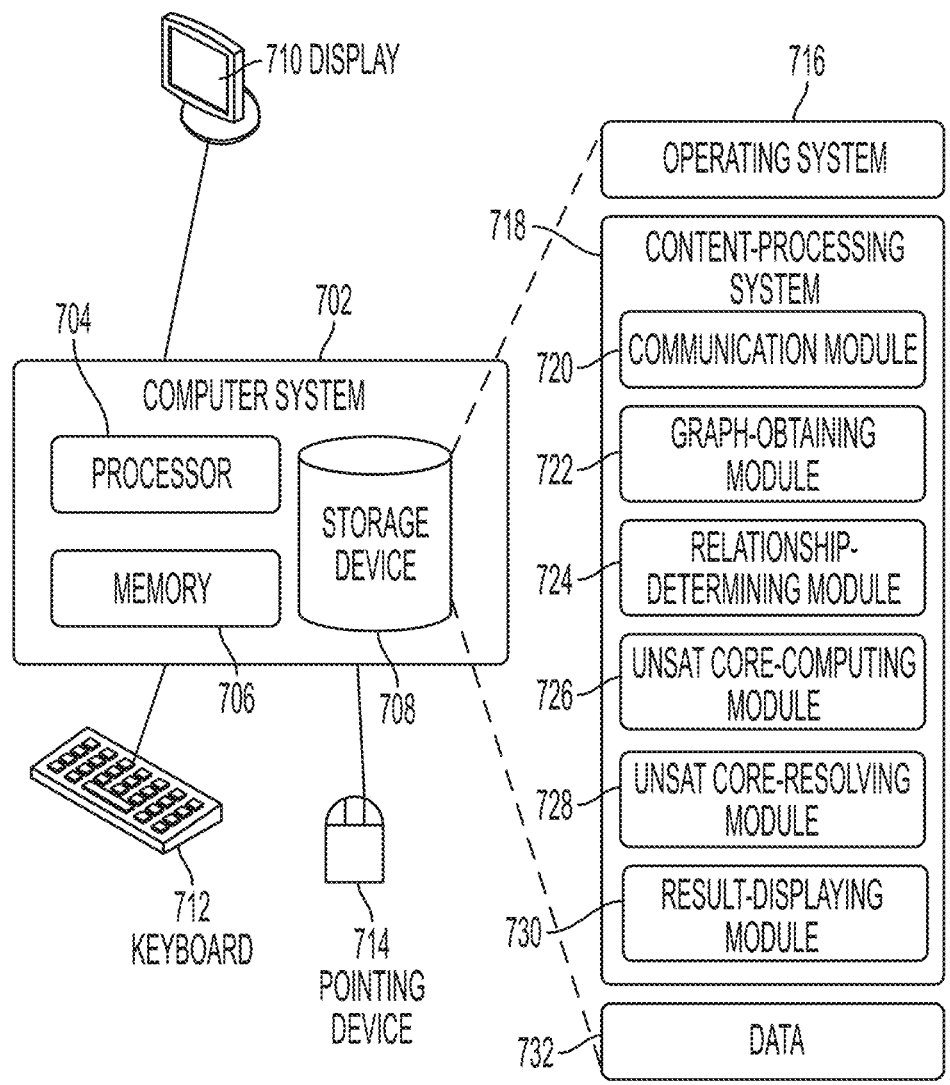
FIG. 7 illustrates an exemplary distributed computer and communication system that facilitates reasoning about the optimality of a configuration parameter of a distributed system, in accordance with an embodiment of the present application.

FIG. 7 illustrates an exemplary distributed computer and communication system 702 that facilitates reasoning about the optimality of a configuration parameter of a distributed system, in accordance with an embodiment of the present application. Computer system 702 includes a processor 704, a memory 706, and a storage device 708. Memory 706 can include a volatile memory (e.g., RAM) that serves as a managed memory, and can be used to store one or more memory pools. Furthermore, computer system 702 can be coupled to a display device 710, a keyboard 712, and a pointing device 714. Storage device 708 can store an operating system 716, a content-processing system 718, and data 732.

Content-processing system 718 can include instructions, which when executed by computer system 702, can cause computer system 702 to perform methods and/or processes described in this disclosure. Specifically, content-processing system 718 may include instructions for sending and/or receiving/obtaining data packets to/from other network nodes across a computer network (communication module 720). A data packet can include a request, data, configuration information, vulnerability information, dependency information, a command, a strategy, and a recommended configuration.

Content-processing system 718 can further include instructions for obtaining a multi-layer graph for a system with a plurality of components, wherein the multi-layer graph comprises a configuration subgraph, a vulnerability subgraph, and a dependency subgraph (graph-obtaining module 722). Content-processing system 718 can include instructions for determining, based on the multi-layer graph, constraint relationships associated with configuration parameters for the components, wherein the constraint relationships include security constraints and functionality constraints (relationship-determining module 724). Content-processing system 718 can include instructions for computing an unsatisfiable core which comprises a set of mutually incompatible constraints (unsat core-computing module 726). Content-processing system 718 can include instructions for resolving, based on a strategy and over multiple iterations, the unsatisfiable core by analyzing one pair of mutually incompatible constraints per a respective iteration, to obtain a new unsatisfiable core which comprises a smaller number of mutually incompatible constraints than the computed unsatisfiable core or a previously computed unsatisfiable core from a most recent iteration (unsat core-resolving module 728).

Content-processing system 718 can also include instructions for displaying, on a screen of a user device, one or more interactive elements which allow the user to view various information (result-displaying module 730), e.g., for a respective iteration, one or more of: a number corresponding to the respective iteration; whether the new unsatisfiable core is empty; a remaining set of mutually incompatible constraints; an indicator of a constraint removed from the previously computed unsatisfiable core; the non-empty unsatisfiable core; the remaining set of mutually incompatible constraints; and the reason for a respective remaining mutually incompatible constraint.

Data 732 can include any data that is required as input or that is generated as output by the methods and/or processes described in this disclosure. Specifically, data 732 can store at least: data; a command; a request; an indicator or identifier of a configuration subgraph, a dependency subgraph, or a vulnerability node; a configuration subgraph node, a dependency subgraph node, or a vulnerability subgraph node; a directed edge in a subgraph; a directed edge between subgraphs; a configuration parameter; a configuration constraint; a security constraint; a functionality constraint; an unsat core; a set of mutually incompatible constraints; a set of mutually compatible constraints; a list; an ordered list; a randomly ordered list; a strategy or policy; an algorithm; encoded information; a name; a default value; a range of values; a data type; a first or a second class of nodes; a relationship; a known vulnerability; an identifier or indicator of a component, a bad security practice, or a best security practice; a divided subset of components; a number corresponding to a respective iteration; a number of iterations; an indicator of a failure to produce an empty unsat core; a result of resolving the unsat core; a constraint satisfaction problem (CSP); and a solution to the CSP.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
    obtaining a multi-layer graph for a system with a plurality of components, wherein the multi-layer graph comprises a configuration subgraph, a vulnerability subgraph, and a dependency subgraph;
    determining, based on the multi-layer graph, constraint relationships associated with configuration parameters for the components, wherein the constraint relationships include security constraints and functionality constraints;
    computing an unsatisfiable core which comprises a set of mutually incompatible constraints; and
    resolving, based on a strategy and over multiple iterations, the unsatisfiable core by analyzing one pair of mutually incompatible constraints per a respective iteration, to obtain a new unsatisfiable core which comprises a smaller number of mutually incompatible constraints than the computed unsatisfiable core or a previously computed unsatisfiable core from a most recent iteration.

2. The method of claim 1,
    wherein the functionality constraints positively express functionality requirements associated with the components based on one or more of:
        a connectivity between components;
        a configuration parameter for a respective component;
        a first relationship between configuration parameters associated with a single component; and
        a second relationship between configuration parameters associated with a pair of components; and
    wherein the security constraints include one or more of:
        a positive expression of known security vulnerabilities or a negation of predicates corresponding to the known security vulnerabilities, wherein the known security vulnerabilities are obtained from a public or a proprietary database;
        a positive expression of bad security practices or a negation of predicates corresponding to the bad security practices; and
        a positive expression of best security practices or a negation of predicates corresponding to the best security practices.

3. The method of claim 1, wherein resolving the unsatisfiable core based on the strategy and over multiple iterations is based on one or more of:
an operational context of the system;
improving a current configuration of the system without prioritizing security over functionality or functionality over security;
preserving constraints which prioritize security over functionality; and
preserving constraints which prioritize functionality over security.

4. The method of claim 1, wherein resolving the unsatisfiable core based on the strategy and over multiple iterations comprises:
dividing the components of the system into subsets of components;
assigning a strategy to each subset; and
employing the assigned strategy in the multiple iterations of resolving the unsatisfiable core.

5. The method of claim 1, further comprising:
determining that resolving the unsatisfiable core based on the strategy and over multiple iterations results in an empty unsatisfiable core and a set of mutually compatible constraints,
wherein the configuration parameters which satisfy the mutually compatible constraints are associated with a desired output configuration.

6. The method of claim 5, further comprising:
displaying, on a screen of a user device, one or more interactive elements which allow the user to view, for a respective iteration, one or more of:
a number corresponding to the respective iteration;
whether the new unsatisfiable core is empty;
a remaining set of mutually incompatible constraints; and
an indicator of a constraint removed from the previously computed unsatisfiable core.

7. The method of claim 1, further comprising:
determining that resolving the unsatisfiable core based on the strategy and over multiple iterations results in a non-empty unsatisfiable core which comprises a remaining set of mutually incompatible constraints; and
returning the non-empty unsatisfiable core and a reason for the remaining set of mutually incompatible constraints.

8. The method of claim 7, further comprising:
displaying, on a screen of a user device, one or more interactive elements which allow the user to view one or more of:
the non-empty unsatisfiable core;
the remaining set of mutually incompatible constraints; and
the reason for a respective remaining mutually incompatible constraint.

9. The method of claim 1, further comprising terminating the multiple iterations of resolving the unsatisfiable core based on one or more of:
reaching a number of the multiple iterations, wherein the number is configured by a user of the system or set as a default by the system;
exceeding the number of the multiple iterations; and
determining a failure to produce an empty unsatisfiable core.

10. The method of claim 1,
wherein resolving the unsatisfiable core based on the strategy and over multiple iterations is based on generating a constraint satisfaction problem,
wherein the constraint satisfaction problem is based on one or more of:
determining that constraints associated with the configuration subgraph are satisfied;
determining that constraints associated with the dependency subgraph are satisfied; and
minimizing a security impact of all attack paths traversable in the multi-layer graph;
and wherein the method further comprises:
terminating the multiple iterations of resolving the unsatisfiable core based on determining a failure to produce a solution to the constraint satisfaction problem.

11. A computer system, the system comprising:
a processor; and
a storage device storing instructions that when executed by the processor cause the processor to perform a method, the method comprising:
obtaining a multi-layer graph for a system with a plurality of components, wherein the multi-layer graph comprises a configuration subgraph, a vulnerability subgraph, and a dependency subgraph;
determining, based on the multi-layer graph, constraint relationships associated with configuration parameters for the components, wherein the constraint relationships include security constraints and functionality constraints;
computing an unsatisfiable core which comprises a set of mutually incompatible constraints; and
resolving, based on a strategy and over multiple iterations, the unsatisfiable core by analyzing one pair of mutually incompatible constraints per a respective iteration, to obtain a new unsatisfiable core which comprises a smaller number of mutually incompatible constraints than the computed unsatisfiable core or a previously computed unsatisfiable core from a most recent iteration.

12. The computer system of claim 11,
wherein the functionality constraints positively express functionality requirements associated with the components based on one or more of:
a connectivity between components;
a configuration parameter for a respective component;
a first relationship between configuration parameters associated with a single component; and
a second relationship between configuration parameters associated with a pair of components; and
wherein the security constraints include one or more of:
a positive expression of known security vulnerabilities or a negation of predicates corresponding to the known security vulnerabilities, wherein the known security vulnerabilities are obtained from a public or a proprietary database;
a positive expression of bad security practices or a negation of predicates corresponding to the bad security practices; and
a positive expression of best security practices or a negation of predicates corresponding to the best security practices.

13. The computer system of claim 11, wherein resolving the unsatisfiable core based on the strategy and over multiple iterations is based on one or more of:

an operational context of the system;
improving a current configuration of the system without prioritizing security over functionality or functionality over security;
preserving constraints which prioritize security over functionality; and
preserving constraints which prioritize functionality over security.

14. The computer system of claim 11, wherein resolving the unsatisfiable core based on the strategy and over multiple iterations comprises:
dividing the components of the system into subsets of components;
assigning a strategy to each subset; and
employing the assigned strategy in the multiple iterations of resolving the unsatisfiable core.

15. The computer system of claim 11, wherein the method further comprises:
determining that resolving the unsatisfiable core based on the strategy and over multiple iterations results in an empty unsatisfiable core and a set of mutually compatible constraints,
wherein the configuration parameters which satisfy the mutually compatible constraints are associated with a desired output configuration; and
displaying, on a screen of a user device, one or more interactive elements which allow the user to view, for a respective iteration, one or more of:
a number corresponding to the respective iteration;
whether the new unsatisfiable core is empty;
a remaining set of mutually incompatible constraints; and
an indicator of a constraint removed from the previously computed unsatisfiable core.

16. The computer system of claim 11, wherein the method further comprises:
determining that resolving the unsatisfiable core based on the strategy and over multiple iterations results in a non-empty unsatisfiable core which comprises a remaining set of mutually incompatible constraints; and
returning the non-empty unsatisfiable core and a reason for the remaining set of mutually incompatible constraints; and
displaying, on a screen of a user device, one or more interactive elements which allow the user to view one or more of:
the non-empty unsatisfiable core;
the remaining set of mutually incompatible constraints; and
the reason for a respective remaining mutually incompatible constraint.

17. The computer system of claim 11, wherein the method further comprises terminating the multiple iterations of resolving the unsatisfiable core based on one or more of:
reaching a number of the multiple iterations, wherein the number is configured by a user of the system or set as a default by the system;
exceeding the number of the multiple iterations; and
determining a failure to produce an empty unsatisfiable core.

18. The computer system of claim 11,
wherein resolving the unsatisfiable core based on the strategy and over multiple iterations is based on generating a constraint satisfaction problem,
wherein the constraint satisfaction problem is based on one or more of:
determining that constraints associated with the configuration subgraph are satisfied;
determining that constraints associated with the dependency subgraph are satisfied; and
minimizing a security impact of all attack paths traversable in the multi-layer graph;
and wherein the method further comprises:
terminating the multiple iterations of resolving the unsatisfiable core based on determining a failure to produce a solution to the constraint satisfaction problem.

19. A non-transitory computer-readable storage medium storing instructions that when executed by a computer cause the computer to perform a method, the method comprising:
obtaining a multi-layer graph for a system with a plurality of components, wherein the multi-layer graph comprises a configuration subgraph, a vulnerability subgraph, and a dependency subgraph;
determining, based on the multi-layer graph, constraint relationships associated with configuration parameters for the components, wherein the constraint relationships include security constraints and functionality constraints;
computing an unsatisfiable core which comprises a set of mutually incompatible constraints; and
resolving, based on a strategy and over multiple iterations, the unsatisfiable core by analyzing one pair of mutually incompatible constraints per a respective iteration, to obtain a new unsatisfiable core which comprises a smaller number of mutually incompatible constraints than the computed unsatisfiable core or a previously computed unsatisfiable core from a most recent iteration.

20. The storage medium of claim 19, wherein resolving the unsatisfiable core based on the strategy and over multiple iterations is based on one or more of:
an operational context of the system;
improving a current configuration of the system without prioritizing security over functionality or functionality over security;
preserving constraints which prioritize security over functionality; and
preserving constraints which prioritize functionality over security; and
wherein the method further comprises terminating the multiple iterations of resolving the unsatisfiable core based on one or more of:
reaching a number of the multiple iterations, wherein the number is configured by a user of the system or set as a default by the system;
exceeding the number of the multiple iterations; and
determining a failure to produce an empty unsatisfiable core.

* * * * *